(12) United States Patent
Impellizeri

(10) Patent No.: US 7,779,555 B2
(45) Date of Patent: *Aug. 24, 2010

(54) LOCKING ENGINE RESERVOIR DIPSTICK MODULE

(75) Inventor: John Impellizeri, Knoxville, TN (US)

(73) Assignee: Lokar, Inc., Knoxville, TN (US)

( * ) Notice: Subject to any disclaimer, the term of this patent is extended or adjusted under 35 U.S.C. 154(b) by 56 days.

This patent is subject to a terminal disclaimer.

(21) Appl. No.: 12/200,602

(22) Filed: Aug. 28, 2008

(65) Prior Publication Data

US 2009/0151184 A1    Jun. 18, 2009

Related U.S. Application Data

(63) Continuation-in-part of application No. 11/955,887, filed on Dec. 13, 2007, now Pat. No. 7,546,693.

(51) Int. Cl.
    *G01F 23/04*    (2006.01)
(52) U.S. Cl. ........................................ 33/731
(58) Field of Classification Search .................... 33/731
    See application file for complete search history.

(56) References Cited

U.S. PATENT DOCUMENTS

| | | | |
|---|---|---|---|
| 3,474,884 A * | 10/1969 | Braun | 184/109 |
| 3,722,102 A * | 3/1973 | Jackson et al. | 33/731 |
| 3,991,476 A * | 11/1976 | Haines | 33/731 |
| 5,014,445 A * | 5/1991 | Martell | 33/731 |
| 5,485,681 A * | 1/1996 | Hitchcock | 33/722 |
| 5,613,303 A * | 3/1997 | Kayano et al. | 33/731 |
| 5,829,153 A * | 11/1998 | Hitchock | 33/728 |
| 5,992,037 A * | 11/1999 | Klotz | 33/722 |
| 6,453,740 B1 * | 9/2002 | Williams et al. | 73/290 B |
| 7,546,693 B1 * | 6/2009 | Impellizeri | 33/731 |
| 2009/0049706 A1 * | 2/2009 | Hart et al. | 33/731 |

* cited by examiner

*Primary Examiner*—Christopher W Fulton
(74) *Attorney, Agent, or Firm*—Pitts & Brittian, P.C.

(57) ABSTRACT

A flexible locking dipstick module useful with a motor vehicle including an oil reservoir. A dipstick is disposed within a housing which has one end thereof affixed to the oil reservoir and extends therefrom to a location within the engine compartment of a motor vehicle. The end of the module disposed within the engine compartment includes a quick disconnect locking coupling providing for ready installation and removal of the dipstick. The coupling further provides protection against blow out of the dipstick in the event of inordinate build up of pressure within the oil reservoir. Further, one portion of the outboard coupling may be employed as a liquid-tight closure for a dipstick entry opening in the oil reservoir during removal and/or storage of the engine.

11 Claims, 3 Drawing Sheets

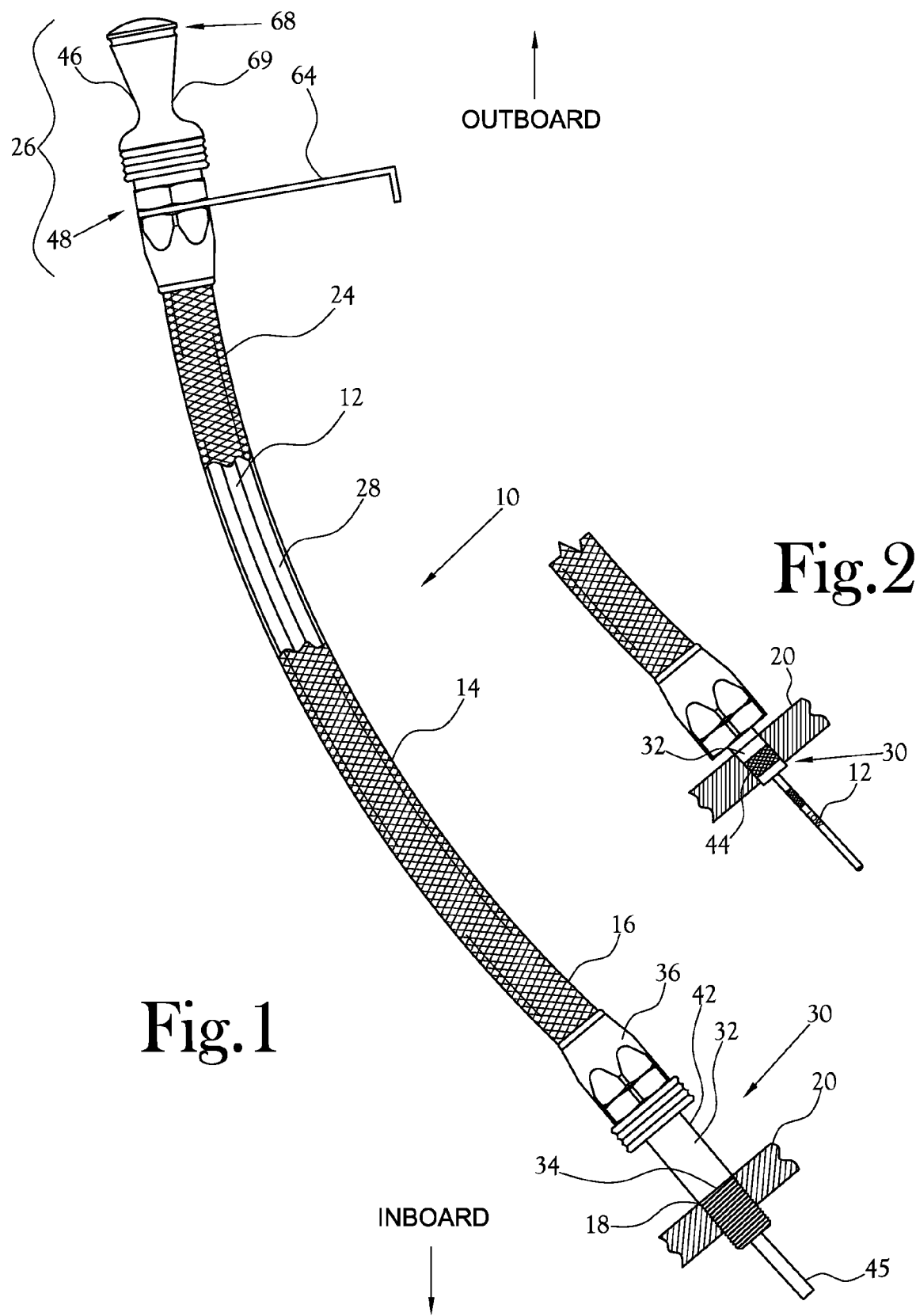

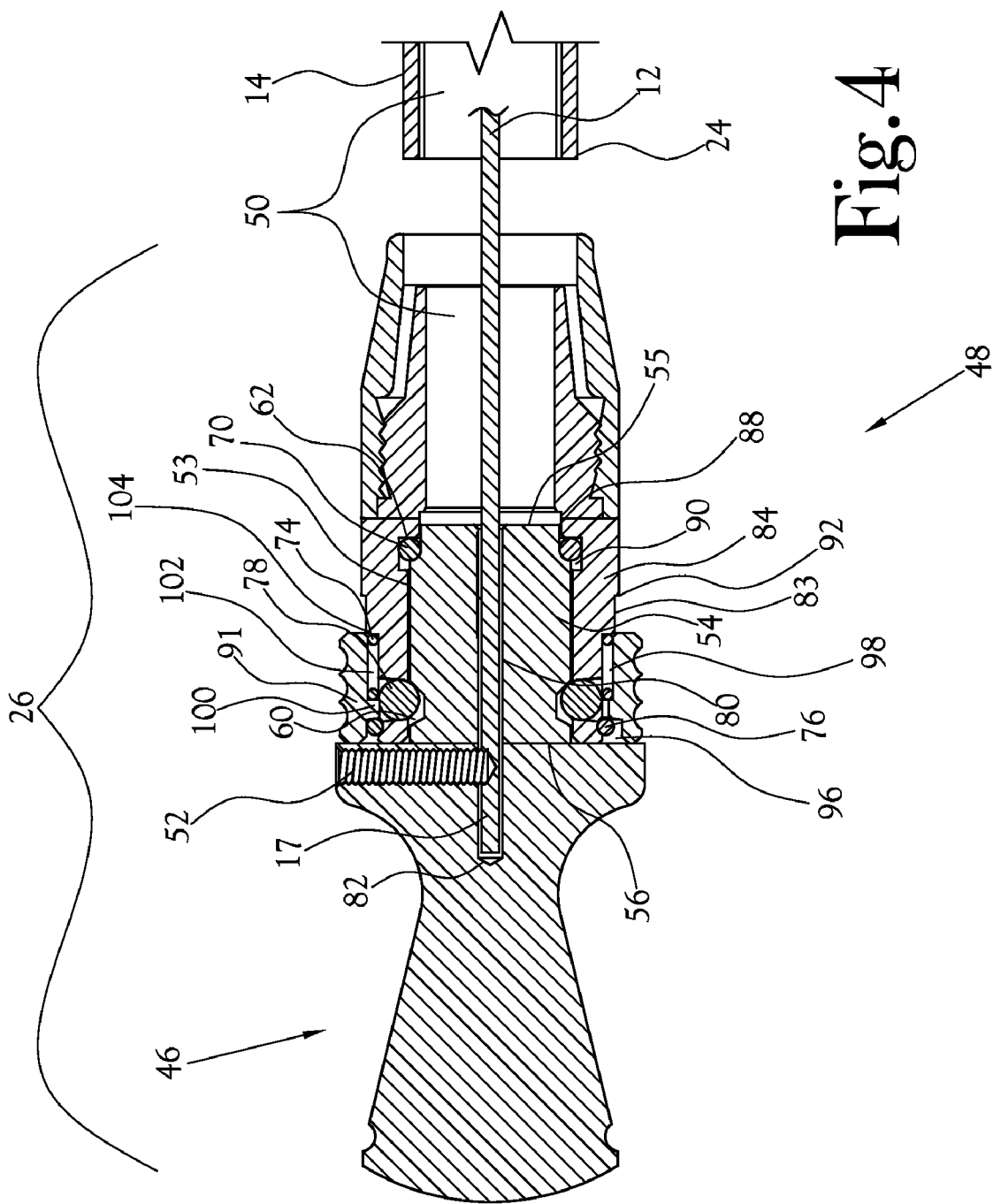

US 7,779,555 B2

LOCKING ENGINE RESERVOIR DIPSTICK MODULE

CROSS-REFERENCE TO RELATED APPLICATIONS

This application is a continuation in part of U.S. patent application Ser. No. 11/955,887, filed Dec. 13, 2007, now issued as U.S. Pat. No. 7,546,693, entitled LOCKING FLEXIBLE TRANSMISSION DIPSTICK, upon which priority is claimed and the entirety of which is incorporated herein reference.

STATEMENT REGARDING FEDERALLY SPONSORED RESEARCH OR DEVELOPMENT

Not Applicable

BACKGROUND OF THE INVENTION

1. Field of Invention

This invention relates to motor vehicle parts and accessories and particularly to dipsticks useful in the engine lubricant (oil) reservoir (at times referred to as "oil pan" of the engine for a motor vehicle.

2. Background

In motor vehicles, dipsticks are employed for purposes of visual inspection of the quantity (and to a lesser degree of the quality) of fluid located within a closed reservoir in a motor vehicle. In general, oil reservoirs of motor vehicles commonly are provided with an opening leading from external of the oil reservoir into the interior of the reservoir. Often this opening is provided with a fitting, such as a hollow tube. An inboard end of the tube is mounted in the opening leading into the reservoir with the tube extending from the oil reservoir to a terminal location within the engine compartment of the vehicle where the outboard end of the tube is commonly anchored to an engine head or other structure within the engine compartment of the motor vehicle, remote from the oil reservoir. Thus, the open outboard end of the tube is readily accessible within the engine compartment of a motor vehicle. An elongated removable dipstick commonly is inserted into the outboard end of the tube and extends into the interior of the oil reservoir whereupon the hollow tube becomes a housing for the dipstick. Within the oil reservoir, the inboard end of the dipstick becomes immersed within the fluid disposed within the reservoir. The extent of insertion of the dipstick into the reservoir is limited to a constant value established commonly by some form of stop on the dipstick which engages the outboard end of the tube to limit that distance by which the dipstick may be inserted into the reservoir. Such extent of insertion distance is thus maintained constant over each and every time the dipstick is inserted into the reservoir. By this means, upon withdrawal of the dipstick from the reservoir, the level of fluid on that end of the dipstick which is inserted into the reservoir is indicative of the level (quantity) of fluid within the reservoir. Other than during the action of checking the level of fluid within the reservoir, the dipstick is stored within its tubular housing. The structure of the outboard end of the dipstick may include a structural element which is frictionally slidably received within the outboard end of the tubular housing and serves in part to seal off the open outboard end of housing. These devices are prone to leakage of lubricant fluid from the tubular housing and fail to ensure the retention of the dipstick within the housing under certain vehicle operating conditions.

In certain motor vehicles, such as racing cars, the operation of the vehicle may build up inordinate pressure within the oil reservoir. Such pressure levels may be sufficient to "blow out" a prior art dipstick from its elongated tubular housing with obvious disastrous results which may include starting a fire within the engine compartment of the vehicle. Also, there exist the problems associated with oil leaking onto a race trace, resulting in slick tires, crashes and monetary penalties.

Furthermore, a prior art oil reservoir dipstick can become freed from its housing, thereby allowing air to leak through the dipstick housing into the engine crankcase. Certain motor vehicles, such as racing cars of the type typically used in the drag racing industry, are equipped with vacuum systems configured to assist in evacuating the crankcase of the vehicle engine, thereby increasing the overall horsepower of the vehicle during operation. In such vehicles, air leakage into the crankcase interferes with the vacuum system, thereby resulting in decreased horsepower of the vehicle.

BRIEF SUMMARY OF THE INVENTION

The present invention comprises a flexible locking dipstick module useful with a motor vehicle including an oil reservoir. The dipstick is disposed within a housing which has one end thereof affixed to the oil reservoir and extends therefrom to a location within the engine compartment of the motor vehicle. The portion of the module disposed within the engine compartment includes a quick disconnect locking coupling providing for ready installation and removal of the dipstick, while providing protection against blow out of the dipstick and loss of vacuum pressure.

BRIEF DESCRIPTION OF THE SEVERAL VIEWS OF THE DRAWINGS

The above-mentioned features of the invention will become more clearly understood from the following detailed description of the invention read together with the drawings in which:

FIG. 1 is a representation of a dipstick module embodying various aspects of the present invention;

FIG. 2 is a partial-view representation of an alternative embodiment of the inboard end portion of the dipstick module depicted in FIG. 1;

DETAILED DESCRIPTION OF THE INVENTION

Figure 3:
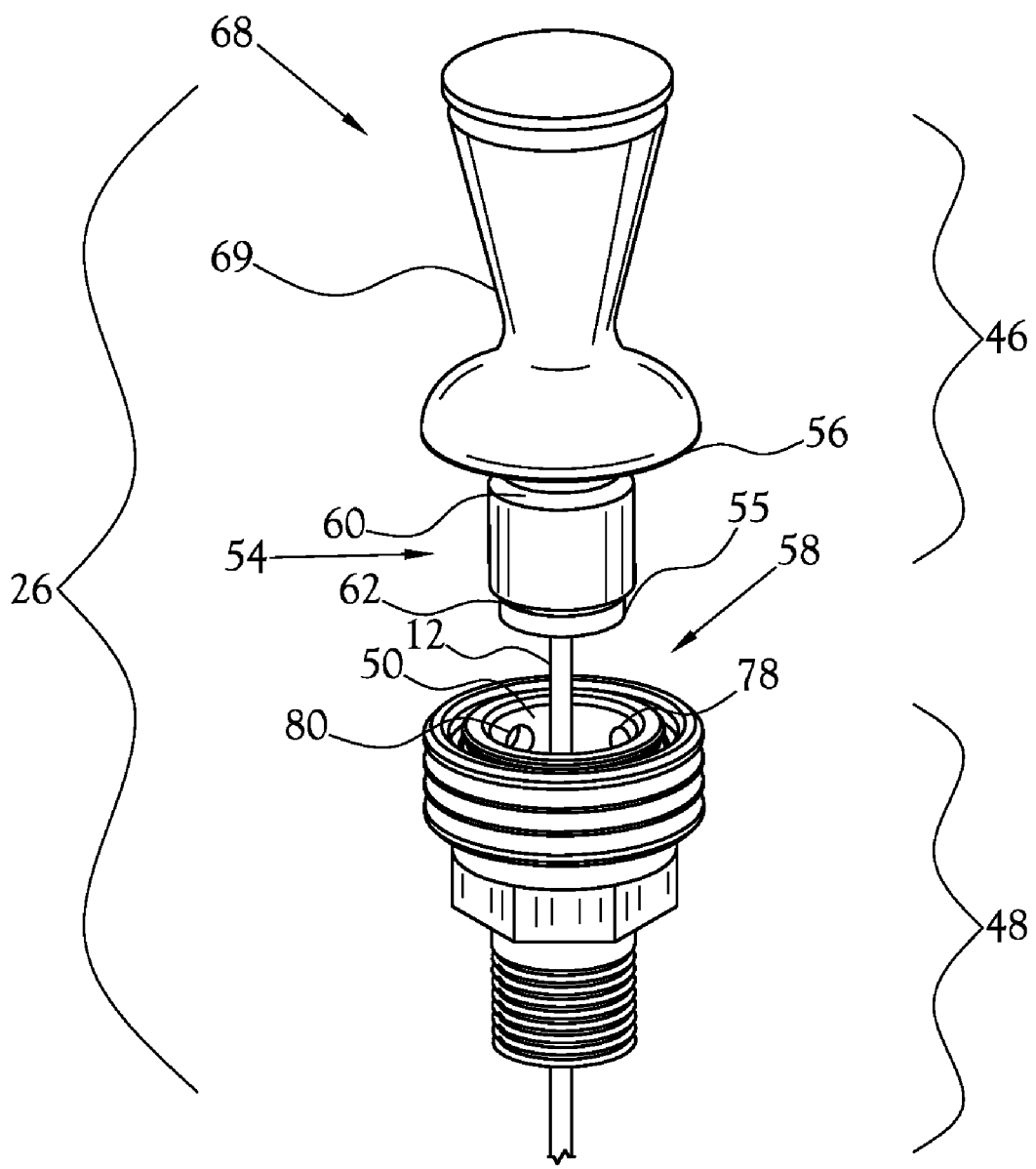
FIG. 3 is a partial exploded view showing the two major separable elements of a coupling of the dipstick module depicted in FIG. 1; and, FIG. 4 is a side view, in section, of the outboard end of the dipstick module depicted in FIG. 1.

In one embodiment of the present invention as depicted in the several figures, it will be noted that the invention 10 comprises a dipstick module including an elongated dipstick 12 disposed within an elongated housing 14 having an inboard end 16 thereof mounted in an opening 18 in the wall of an oil reservoir 20 of a motor vehicle engine, and an outboard end 24 which is incorporated into a quick connect coupling 26 adapted to provide for rapid and easy insertion of the dipstick 12 into the present module in fluid-tight sealing relationship and subsequent withdrawal of the dipstick 12 from the oil reservoir, separately from those elements of the module which provide for the mounting and securing of the dipstick 12 with respect to the vehicle oil reservoir.

Preferably this dipstick 12 is flexible along its length for slidable disposition within the elongated hollow, dipstick housing 14. In a preferred embodiment this housing 14 comprises braided metallic strands disposed about a fluid impervious flexible inner lining 28, thereby rendering the housing flexible and resistant to rupture. A typical housing exhibits an internal diameter of less than one inch and is capable of withstanding fluid pressures in excess of one hundred pounds per square inch. One suitable lining material is a polymeric material such as Teflon® which is resistant to the motor oil present in the oil reservoir. One skilled in the art will recognize that other suitable liner materials may be employed.

In accordance with one aspect of the present invention, the inboard end 16 of the dipstick housing is removably anchored to a fitting 30 suitable for the interconnection of the housing 14 to the oil reservoir via the opening 18 through the wall of the reservoir 20. As seen in FIG. 1, this fitting 30 may comprise a hollow tubular sleeve 32 having a first end 42 thereof adapted to be inserted into the inboard end 16 of the dipstick housing 14 and an externally threaded second end 34 adapted to be threaded through the opening 18 in the wall 20 of the reservoir. This fitting 30 further includes a tubular shroud 36 adapted to be threaded onto the sleeve 32, thereby capturing, sealing, and anchoring the inboard end 16 of the dipstick housing 14 between the sleeve 32 and shroud 36.

As depicted in FIG. 2, alternatively, in lieu of threads on the sleeve 32 for anchoring the fitting 30 within the wall of the reservoir 20, the fitting 30 may include a frictional circumferential surface 44 adapted to provide for a frictional fit of the sleeve 32 within the opening 18 in the wall of the reservoir 20. In either embodiment, the fitting 30 is sufficiently secured within the opening 18 in the wall of the oil reservoir 20 as to preclude expulsion of the fitting 30 from the wall opening 18 under conditions of the buildup of inordinate pressure within the oil reservoir as will appear further hereinafter.

The quick connect coupling 26 includes first and second major elements 46 and 48, respectively. An outboard end of the dipstick 12 is anchored to the first major element 46 of the quick connect coupling 26 as by a set screw 52 (FIG. 4). Referring to FIG. 3, the second major element 48 defines a passageway 50. The outboard end 24 of the dipstick housing 14 is anchored to the second major element 48, such that the passageway 50 allows for the passage of the inboard end of the dipstick 12 through the second major element 48 and into the housing 14.

The first major element 46 of the quick connect coupling 26 is of a knob geometry suitable for grasping in the hand of a user and includes a projection 54 extending inwardly from its inboard end 56. This projection 54 is adapted to be releasably inserted into the open outboard end 58 of the second major element 48 for releasable fluid-tight interconnection of the first and second major elements 46, 48. As seen in FIGS. 3 and 4, this projection 54 is provided with at least first and second outer circumferential grooves 60 and 62, respectively, disposed at spaced apart locations along the length of the projection 54. As will be discussed in further detail below, the circumferential grooves 60, 62 are adapted to engage respective structural elements internally of the second major element 48.

The interconnection of the first and second major elements 46, 48 effects fluid tight pressure sealing of the first and second major elements 46, 48 to one another, thereby effecting closure of the dipstick housing 14 and discouraging pressurized oil originating within the oil reservoir from escaping into the environment externally of the module 10. The interconnection of the first and second major elements 46, 48 also provides for easy, quick connection and disconnection of the first major element 46 from the second major element 48 for purposes of removal and reinsertion of the dipstick 12 from and into the oil reservoir.

As noted, the first major element 46 of the coupling 26 comprises a knob 68 having a shaped portion 69 thereof which preferably is contoured in a manner to facilitate grasping of the knob 68 in a user's hand. The first major element 46 also includes an elongated cylindrical projection 54 extending linearly from the inboard end 56 of the knob. This projection 54 is adapted to be received in locking liquid-tight sealing, but removable, relationship within the second major element 48 of the coupling 26 when the dipstick 12 is inserted within its housing 14. Thus, the coupling 26 functions as an aid to lock the first and second major elements 46, 48 in engagement in order to preclude expulsion of the dipstick 12 and pressurized fluid from the reservoir into the atmosphere exterior of the module, such as during buildup of potentially damaging fluid pressure within the reservoir. Also, the coupling 26 functions to establish the extent to which the dipstick 12 may enter the housing 14, and hence establishes the depth to which the inboard end 45 of the dipstick 12 may become immersed in fluid contained within the reservoir.

As noted, the second one 48 of the two major elements of the quick connection coupling 26 is of a hollow, generally tubular geometry. The open outboard end 58 of this second major element receives internally thereof an "O" ring seal 70, a coil spring 74, a retention ring 76, and a plurality of ball bearings 78. The ball bearings 78 are partially embedded within appropriate through holes 80 in the body portion 84 of the second major element 48 of the coupling 26 at circumferentially spaced apart locations proximate the outboard end thereof. In the depicted embodiment, the through holes 80 are contoured to permit each ball bearing to project outwardly from both the inner and outer circumferences of the outboard end 58 of the second major element proximate its outboard end.

As depicted in FIG. 4, the second major element 48 of the coupling 26 is provided with a first circumferential open groove 88 in the inner wall 53 of the second major element at a location approximately half-way between the opposite ends of the second major element. The first open groove 88 is sized to accept therein the distal end 55 of the projection 54 of the first major element of the coupling. Immediately adjacent the first open groove 88, and on the outboard side of the first open groove 88, there is provided a second circumferential open groove 90 which is of a larger outer diameter than the first open groove 88 and defines an annular receptacle for the ring seal 70. The ring seal 70 provides a substantially fluid-tight seal between the first and second major elements 46, 48 when the first and second major elements 46, 48 are coupled.

Externally of the outboard end of the second major element 48 there is provided a circumferential collar 91. The collar 91 is selectively slidable along a portion of the outer wall 83 of the second major element 48 between an outer circumferential shoulder 92 defined by the outer wall 83 of the second major element 48 and a retention ring 76 disposed within a circumferential groove 96 proximate the outboard end the outer wall 83 of the second major element 48. This collar 91 is of an inner diameter greater than the outer diameter of the outboard end of the second major element 48, such that there is defined between the collar 91 and the outer wall 83 an open annular space 98.

Further, the collar is provided with a circumferential flange 100 disposed proximate the outboard end of the inner wall 102 of the collar. This flange 100 serves, among other things, to establish concentricity between the collar 91 and the underlying outer wall 83 of the outboard end of the second major element 48.

Within the annular space 98 between the collar and the outboard end of the second major element 48, there is provided a coil spring 74 which encircles a portion of the outer wall 83 of the second major element 48. This coil spring 74 is captured in the open annular space 98 between the collar 91 and the outer wall 83 of the second major element 48, and between a circumferential flange 104 on the outer wall 83 of the second major element 48 and the circumferential flange 100 on the outboard end of the inner wall 102 of the collar 91. The spring 74 thus functions to bias the collar 91 toward a position proximate the outboard end of the second major element 48 and in overlying relationship to the plurality of ball bearings 78.

As depicted, the retention ring 76, disposed in the further groove 96 within the outer wall 83 of the outboard end of the second major element 48, is adapted to halt the outward movement of the collar 91 and prevent the collar from sliding off the outboard end of the second major element 48.

The partial embedment of the plurality of ball bearings within their respective through holes in the wall of the second major element 48 proximate, but interiorly of, the retention ring 76, provides for a relatively small portion of the outer surface of each ball bearing 78 to project radially inwardly from the inner wall 53 of the second major element into the passageway 50 of the second major element. In this manner, the ball bearings 78 are adapted to engage the projection 54 of the first major element 46 of the coupling 26. To this end, the spring 74 functions to bias the collar 91 toward a position bringing the circumferential flange 100 on the collar 91 into circumferential register with the ball bearings 78, thereby locking the ball bearings 78 into the circumferential groove 60 of the first major element 46 by the established maximum extent, hence releasably locking the first and second major elements of the quick connect coupling to one another. Conversely, the circumferential flange 100 on the collar 91 may be brought out of register with the ball bearings 78, allowing the ball bearings 78 to withdraw from the circumferential groove 60 of the first major element, thereby allowing release of the first and second major elements 46, 48 of the quick connect coupling 26 from one another.

As depicted, the central hollow passageway 50 the second major element 48 permits the passage through of the dipstick 12 (or for the introduction of lubricant fluid into the oil reservoir, if desired). The fitting 30 is configured so as to allow the inboard end 45 of the dipstick 12 to be fed through the hollow fitting 30 and into the interior of the reservoir to become immersed within the oil within the reservoir.

When the first and second major elements 46, 48 of the coupling are fully joined (locked) to one another, the inboard end of the projection 55 enters into the groove 88 defined internally of the second major element 48 of the coupling 26, and engages the ring seal 70 to establish a substantially fluid-tight seal of the passageway 50. When the first and second major elements 46, 48 are fully engaged (including locking of the ball bearings in their respective detents), the foregoing described structure 10 defines a fluid-tight seal at a location approximately halfway between the opposite ends of the coupling 26.

Operationally, it is to be noted that full insertion of the projection 54 of the first major element 46 into the passageway 50 of the second major element 48 can only be accomplished when the collar encircling the second major element of the coupling is urged longitudinally inboard along the second major element against the force of the coil spring 74, thereby moving the internal shoulder 100 of the collar 91 away from engagement with the ball bearings 78 in the wall 83 of the second major element 48. Upon such retraction of the collar 91, full insertion of the projection 54 into the passageway 50 of the second major element 48 serves to position the circumferential groove 60 of the first major element into alignment with the ring of ball bearings 78 disposed in the outboard end of the second major element 48. Thereupon, the collar 91 may be released, resulting in movement of the internal shoulder 100 of the collar 91 into register with the ball bearings 78, thereby locking the first and second major elements 46, 48 of the coupling 26 together. Decoupling of the first and second major elements 48 of the coupling 26 is effected by again urging the collar 91 inboard along the second major element 48, thereby releasing the ball bearings 78 to the extent necessary for separation of the first and second major elements 46, 48, hence disconnecting the coupling 26.

As depicted in FIG. 4, the inboard end of the first major element 46 of the coupling is provided with a blind bore 82 adapted to receive therein the outboard end 17 of the dipstick 12. That portion of the dipstick which resides within such blind bore 82 is anchored therein as by a set screw 52, or other suitable connector. Thus, withdrawal or insertion of the dipstick 12 from its housing 14, and hence from the interior of the oil reservoir, may be accomplished by disconnecting the coupling 26. Importantly, the first major element 46 of the coupling 26 is releasably locked against expulsion of the dipstick 12 upon substantial buildup of pressure within the oil reservoir and/or within the dipstick housing 14 which is in fluid flow communication with the interior of the oil reservoir.

As seen in FIG. 1, the dipstick module 10 may be secured, as by a bracket 64, at a location within the engine compartment, for example, at a location where the first major element 46 is readily accessible for the insertion and withdrawal of the dipstick 12 into and out of the second major element 48, the housing 14, and the oil reservoir. When the present invention is so mounted, the coupling 26 may be readily and quickly decoupled, thereby providing for quick withdrawal of the dipstick 12 from the module.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A flexible locking dipstick module useful with a motor vehicle engine having an oil reservoir having an interior and exterior and an opening providing for fluid and mechanical communication between the exterior and interior of the oil reservoir, said flexible locking dipstick module comprising:

an elongated dipstick having an inboard end and an outboard end;

an elongated dipstick housing having an inboard end and an outboard end, said housing inboard end being adapted to be mounted proximate the oil reservoir; said housing being adapted to receive therein said dipstick for limited insertion of said inboard end of said dipstick into the oil reservoir; and a coupling adapted to provide locking and quick disconnection and reconnection between said outboard end of said housing and said outboard end of said dipstick, said coupling including first and second major components, one of said first and second major components being secured to said outboard end of said dipstick and the other of said first and second major components being secured to said outboard end of said dipstick housing, said first major component defining a projection, said second major component having a generally hollow tubular geometry, said second major component including an open end adapted to releasably receive and engage said projection therein, said coupling further including a collar slidably mounted along one of said first and second major components between a first position and a second position, said collar preventing disengagement of said first and second major components when said collar is in said first position.

2. The module of claim 1 wherein said dipstick is flexible along its length.

3. The module of claim 1 wherein said dipstick housing is flexible along its length.

4. The module of claim 3 wherein said dipstick housing comprises a braided tube.

5. The module of claim 4 wherein said dipstick housing includes a flexible inner lining along the length thereof; said liner being of a material which is resistant to damage or deterioration by motor vehicle engine oil and which enhances the insertion and withdrawal of said dipstick into and out of said housing.

6. The module of claim 1 wherein said quick disconnection and reconnection of said first and second major components is effected manually without the use of tools.

7. The module of claim 1 wherein said collar is biased toward locking position.

8. The module of claim 1 and including bracket means adapted to anchor said housing within an engine compartment of a motor vehicle.

9. A flexible locking dipstick module useful with a motor vehicle engine having an oil reservoir defining an interior and exterior and an opening providing for fluid and mechanical communication between the exterior and interior of the oil reservoir, said flexible locking dipstick module comprising:

an elongated dipstick having an inboard end and an outboard end;

an elongated housing having an inboard end and an outboard end, said housing inboard end being adapted to be mounted in communication with the oil reservoir by way of the opening said housing being adapted to receive therein said dipstick for limited insertion of said dipstick inboard end into the oil reservoir interior; and a coupling adapted to releasably lock said housing outboard end to said dipstick outboard end, said coupling including a first major component and a second major component, said first major component defining a projection having a circumferential groove, said second major component having a generally hollow tubular geometry, said second major component including an open end adapted to releasably receive said projection therein, said second major component further including at least one movable member adapted to engage said groove when said projection is received within said second major component open end to releasably lock said projection within said second major component open end.

10. The flexible locking dipstick module of claim 9, said at least one movable member including a collar slidably mounted along said second major component between a locked position and an unlocked position, whereby when said projection is received within said second major component open end, positioning of said collar in said locked position limits movement of said movable member from engagement of said groove.

11. The flexible locking dipstick module of claim 10, wherein said second major component defines a through opening and wherein said at least one movable member is further defined by a ball bearing sized to be partially embedded in said through opening and to protrude partially from said through opening to engage said groove, whereby positioning of said collar in said locked position prevents disengagement of said ball bearing from said groove when said projection is received within said second major component open end.

* * * * *